(12) United States Patent
Lee et al.

(10) Patent No.: US 9,763,150 B2
(45) Date of Patent: Sep. 12, 2017

(54) METHOD AND APPARATUS FOR ESTABLISHING CONNECTION IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR); Seungjune Yi, Seoul (KR); Sungjun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/779,920

(22) PCT Filed: Apr. 15, 2014

(86) PCT No.: PCT/KR2014/003268
§ 371 (c)(1),
(2) Date: Sep. 24, 2015

(87) PCT Pub. No.: WO2014/171716
PCT Pub. Date: Oct. 23, 2014

(65) Prior Publication Data
US 2016/0044565 A1    Feb. 11, 2016

Related U.S. Application Data

(60) Provisional application No. 61/811,810, filed on Apr. 15, 2013.

(51) Int. Cl.
*H04W 36/18* (2009.01)
*H04W 76/02* (2009.01)
(Continued)

(52) U.S. Cl.
CPC .......... *H04W 36/04* (2013.01); *H04W 36/18* (2013.01); *H04W 48/20* (2013.01); *H04W 76/025* (2013.01)

(58) Field of Classification Search
None
See application file for complete search history.

(56) References Cited

U.S. PATENT DOCUMENTS

2010/0135201 A1* 6/2010 Lewis ................. G06F 8/65
370/328
2011/0212744 A1* 9/2011 Katayama ........... H04W 52/143
455/522
(Continued)

FOREIGN PATENT DOCUMENTS

| EP | 2713650 A1 | 4/2014 |
|---|---|---|
| KR | 10-2010-0038742 | 4/2010 |
| WO | 2013/010418 | 1/2013 |

OTHER PUBLICATIONS

NEC Group, "Small cell operation under macro coverage," 3GPP TSG RAN WG1 Meeting #72, R1-130373, Jan. 2013, 4 pages.
(Continued)

*Primary Examiner* — Chi H Pham
*Assistant Examiner* — Soon-Dong D Hyun
(74) *Attorney, Agent, or Firm* — Lee Hong Degerman Kang & Waimey

(57) ABSTRACT

A method and apparatus for establishing a connection in a wireless communication system is provided. A user equipment (UE) in a connected mode camps on a second cell, transmits a connection request to the second cell, and receives redirection information, which indicates redirection to a first cell or a frequency of the first cell, from the second cell. The UE completes connection with the first cell by transmitting a message.

14 Claims, 16 Drawing Sheets

(51) Int. Cl.
*H04W 36/04* (2009.01)
*H04W 48/20* (2009.01)

(56) References Cited

U.S. PATENT DOCUMENTS

| | | | | |
|---|---|---|---|---|
| 2011/0275361 | A1* | 11/2011 | Yavuz | H04W 52/143 |
| | | | | 455/422.1 |
| 2012/0046026 | A1* | 2/2012 | Chande | H04W 24/10 |
| | | | | 455/422.1 |
| 2012/0149362 | A1* | 6/2012 | Tooher | H04W 24/10 |
| | | | | 455/423 |
| 2015/0004975 | A1* | 1/2015 | Yamamoto | H04W 36/30 |
| | | | | 455/436 |
| 2015/0031369 | A1* | 1/2015 | Gunnarsson | H04W 36/04 |
| | | | | 455/438 |
| 2015/0087313 | A1 | 3/2015 | Kim et al. | |
| 2015/0341977 | A1 | 11/2015 | Fukuta et al. | |

OTHER PUBLICATIONS

PCT International Application No. PCT/KR2014/003268, Written Opinion of the International Authority dated Aug. 1, 2014, 1 page.
3rd Generation Partnership Project, "Technical Specification Group Radio Access Network; User Equipment (UE) procedures in idle mod and procedures for cell reselection in connected mode (Release 11)", 3GPP TS 25.304 V11.2.0, Mar. 2013, 53 pages.
European Patent Office Application No. 14785734.6, Search Report dated Sep. 16, 2016, 11 pages.
European Patent Office Application No. 14785438.4, Search Report dated Sep. 16, 2016, 10 pages.
U.S. Appl. No. 14/774,601, Office Action dated Nov. 17, 2016, 9 pages.

* cited by examiner

METHOD AND APPARATUS FOR ESTABLISHING CONNECTION IN WIRELESS COMMUNICATION SYSTEM

CROSS-REFERENCE TO RELATED APPLICATIONS

This application is the National Stage filing under 35 U.S.C. 371 of International Application No. PCT/KR2014/003268, filed on Apr. 15, 2014, which claims the benefit of U.S. Provisional Application No. 61/811,810, filed on Apr. 15, 2013, the contents of which are all hereby incorporated by reference herein in their entirety.

BACKGROUND OF THE INVENTION

Field of the Invention

The present invention relates to wireless communications, and more specifically, to a method and apparatus for establishing a connection in a wireless communication system.

Related Art

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission (Tx) power is lower than macro node and base station (BS) classes, for example a pico and femto eNodeB (eNB) are both applicable. Small cell enhancements for the 3GPP LTE will focus on additional functionalities for enhanced performance in hotspot areas for indoor and outdoor using low power nodes.

For one feature of small cell enhancements, dual connectivity may be introduced. Dual connectivity is an operation where a given user equipment (UE) consumes radio resources provided by at least two different network points connected with non-ideal backhaul. Furthermore, each eNB involved in dual connectivity for a UE may assume different roles. Those roles do not necessarily depend on the eNB's power class and may vary among UEs.

A method in which a UE establishes a connection is required when the UE supports the dual connectivity.

SUMMARY OF THE INVENTION

The present invention provides a method and apparatus for establishing a connection in a wireless communication system. The present invention provides receiving redirection information and establishing a connection based on the received redirection information.

In an aspect, a method for establishing, by a user equipment (UE), a connection in a wireless communication system is provided. The method includes camping on a second cell, transmitting a connection request to the second cell, receiving redirection information, which indicates redirection to a first cell or a frequency of the first cell, from the second cell, and completing connection with the first cell.

The UE may be in a connected mode.

The connection request may be transmitted via a radio resource control (RRC) connection request message.

The redirection information may include at least one of a cell identity of the first cell, a type of the second cell, or a type of the first cell.

The redirection information may be received via one of an RRC connection setup message, an RRC connection reject message, an RRC connection release message, or an RRC message dedicated to the UE.

The completing connection with the first cell may include transmitting a message to the first cell. The message may be one of an RRC connection setup complete message or an RRC connection reconfiguration complete message. The message may include an identity of the UE.

The method may further include transmitting an RRC connection request message to the first cell.

The method may further include transmitting an RRC connection setup complete message including information on overlaid cell to the second cell.

The method may further include receiving an RRC connection reconfiguration message from the second cell.

The UE may support dual connectivity.

The UE may be not in high mobility.

The first cell may be a macro cell served by a master eNodeB (MeNB), and the second cell may be a small cell served by a secondary eNodeB (SeNB).

In another aspect, a user equipment (UE) in a wireless communication system is provided. The UE includes a radio frequency (RF) unit for transmitting or receiving a radio signal, and a processor coupled to the RF unit, and configured to camp on a second cell, transmit a connection request to the second cell, receive redirection information, which indicates redirection to a first cell or a frequency of the first cell, from the second cell, and complete connection with the first cell.

A UE can establish a connection effectively.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
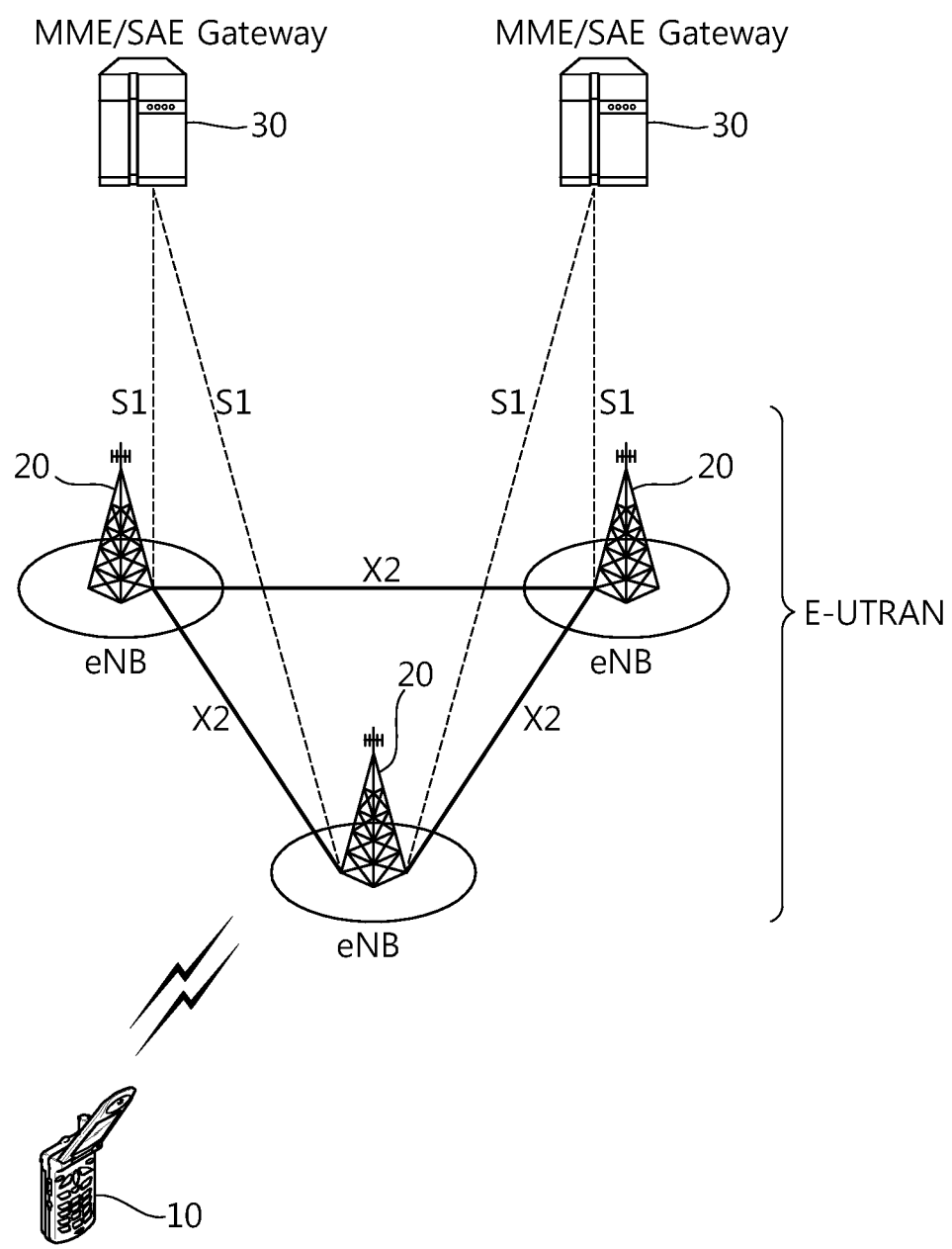
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
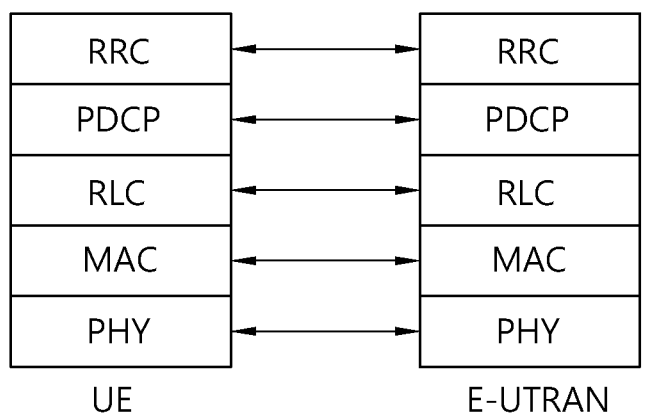
FIG. 2 shows a control plane of a radio interface protocol of an LTE system.
Figure 3:
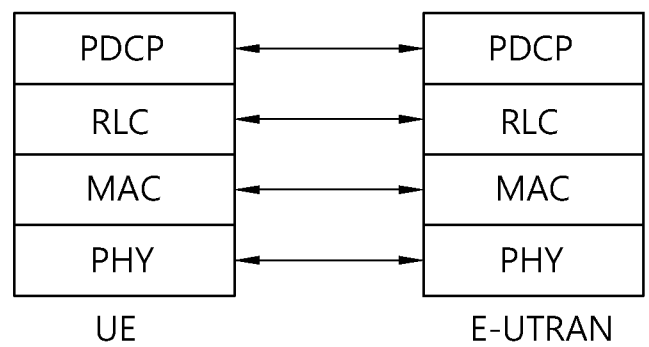
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
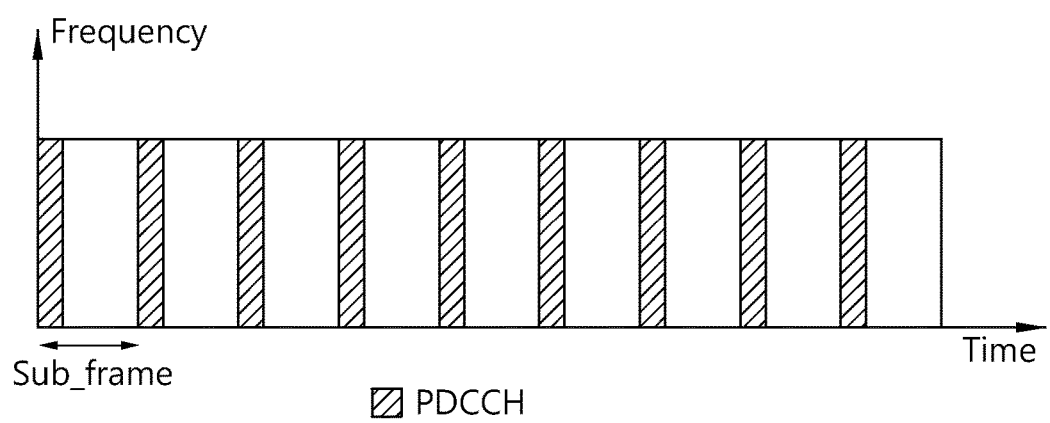
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped to the signature sequence used to transmit messages between a UE and eNB and that either channel quality indicator (CQI) or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

Transmit power=TransmitPilot−RxPilot+ULInterference+Offset+SNRRequired

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value In the UL in the signature.

Small cell enhancement is described. It may be referred to 3GPP TR 36.932 V12.0.0 (2012-12).

Figure 5:
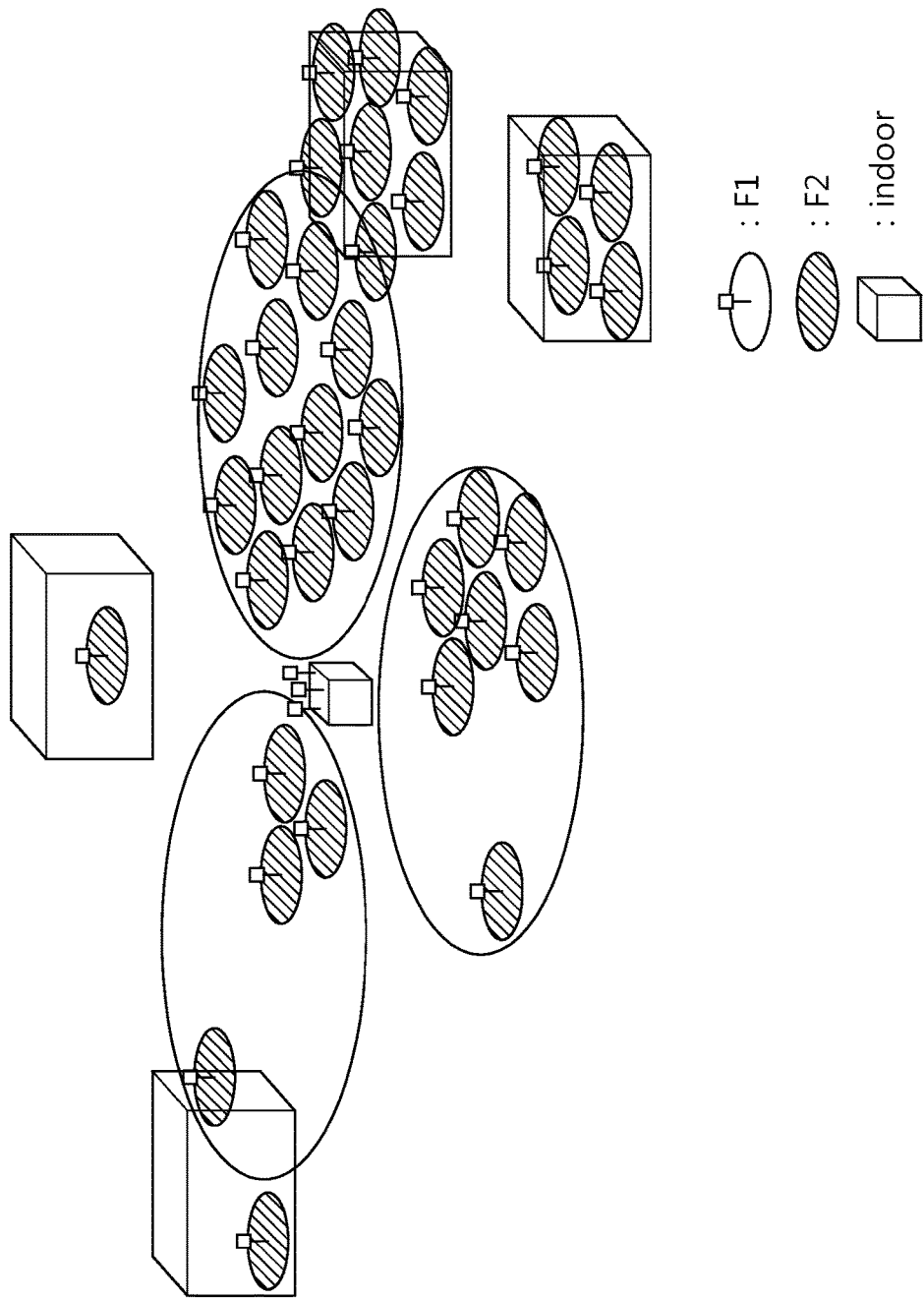
FIG. 5 shows deployment scenarios of small cells with/without macro coverage.

FIG. 5 shows deployment scenarios of small cells with/without macro coverage. Small cell enhancement should target both with and without macro coverage, both outdoor and indoor small cell deployments and both ideal and non-ideal backhaul. Both sparse and dense small cell deployments should be considered.

Referring to FIG. 5, small cell enhancement should target the deployment scenario in which small cell nodes are deployed under the coverage of one or more than one overlaid E-UTRAN macro-cell layer(s) in order to boost the capacity of already deployed cellular network. Two scenarios can be considered:
  where the UE is in coverage of both the macro cell and the small cell simultaneously
  where the UE is not in coverage of both the macro cell and the small cell simultaneously.

Also, the deployment scenario where small cell nodes are not deployed under the coverage of one or more overlaid E-UTRAN macro-cell layer(s) may be considered.

Small cell scenarios for evaluation are described.

Figure 6:
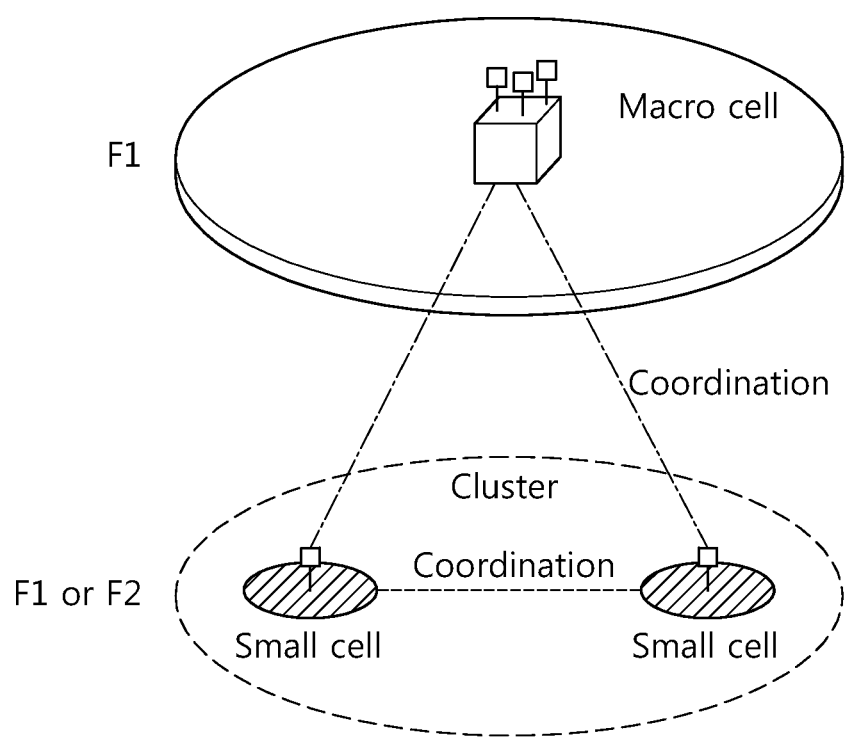
FIG. 6 shows an example of small cell deployment scenario for evaluation.

FIG. 6 shows an example of small cell deployment scenario for evaluation. The small cell deployment scenario described in FIG. 6 is a common design for small cell scenarios for evaluation purpose. It is noted that the addition of scenarios for evaluation of higher-layer aspects may be considered depending on the outcome of the higher-layer studies. Referring to FIG. 6, a macro cell may operate at frequency F1. An overlaid macro cell may be present or not. Small cells, which constitute a small cell cluster, may operate at frequency F1 or F2. The small cells in the small cell cluster may coordinate with each other. The macro cell and the small cells may coordinate with each other.

Figure 7:
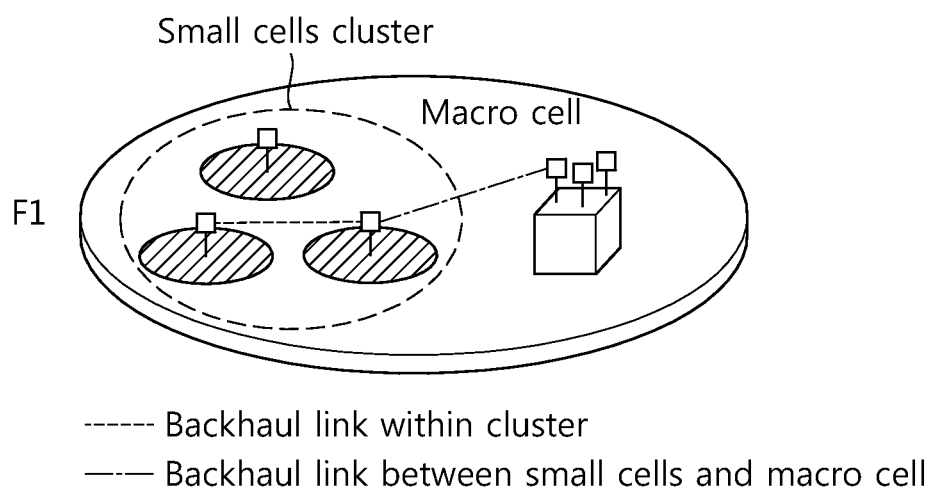
FIG. 7 shows an example of small cell deployment scenario.

FIG. 7 shows an example of small cell deployment scenario. Referring to FIG. 7, small cells are deployed in the presence of an overlaid macro network. The macro cell and the small cells are deployed using the same frequency, i.e., F1. Further, the macro cell and the small cells are deployed in outdoor. Users may be distributed both for outdoor and indoor. Further, a small cell cluster may be considered. The small cell cluster may be denser than scenarios considered for LTE rel-10 enhanced inter-cell interference coordination (eICIC), 3GPP rel-11 further enhanced ICIC (feICIC)/coordinated multi-point (CoMP) transmission/reception. Further, both ideal backhaul and non-ideal backhaul may be considered for an interface between the small cells within the same small cell cluster, or an interface between the small cell cluster and at least one macro eNB. Further, non-ideal backhaul may be assumed for all other interfaces.

Figure 8:
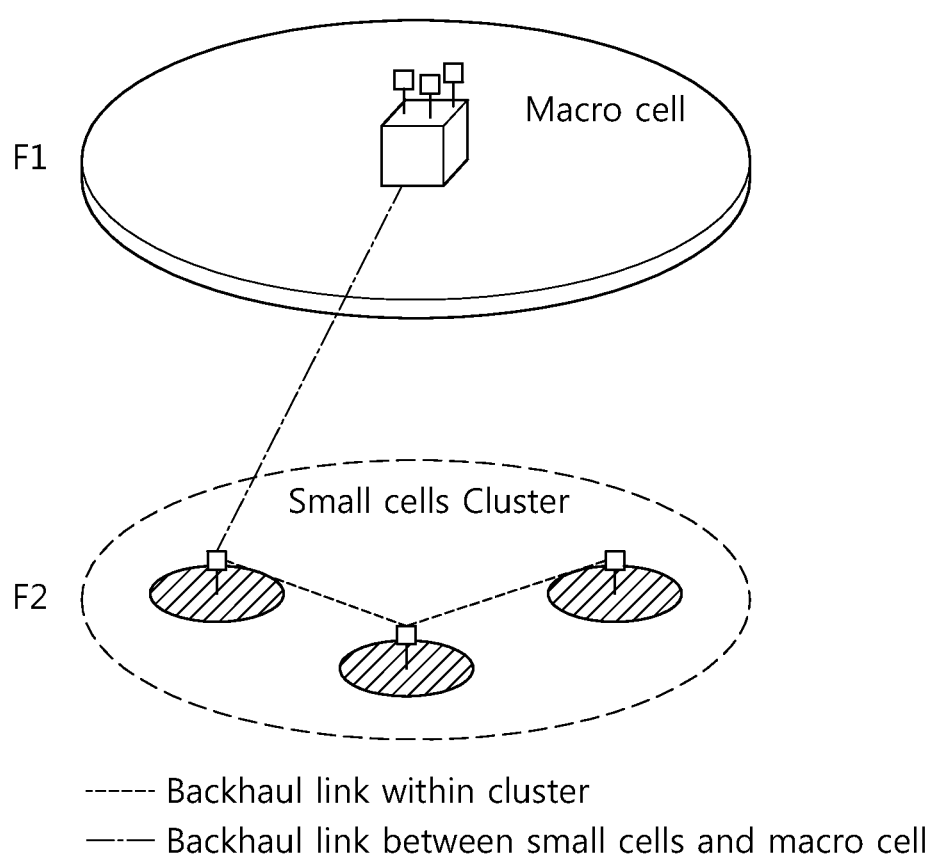
FIG. 8 shows another example of small cell deployment scenario.

FIG. 8 shows another example of small cell deployment scenario. Referring to FIG. 8, small cells are deployed in the presence of an overlaid macro network. The macro cell and the small cells are deployed using different frequencies. That is, the macro cell uses frequency F1, and the small cells use frequency F2. Further, the macro cell and the small cells are deployed in outdoor. Users may be distributed both for outdoor and indoor. Further, a small cell cluster may be considered. The small cell cluster may be denser than scenarios considered for LTE rel-10 eICIC, 3GPP rel-11 feICIC/CoMP transmission/reception. Further, both ideal backhaul and non-ideal backhaul may be considered for an interface between the small cells within the same small cell cluster, or an interface between the small cell cluster and at least one macro eNB. Further, non-ideal backhaul may be assumed for all other interfaces.

Figure 9:
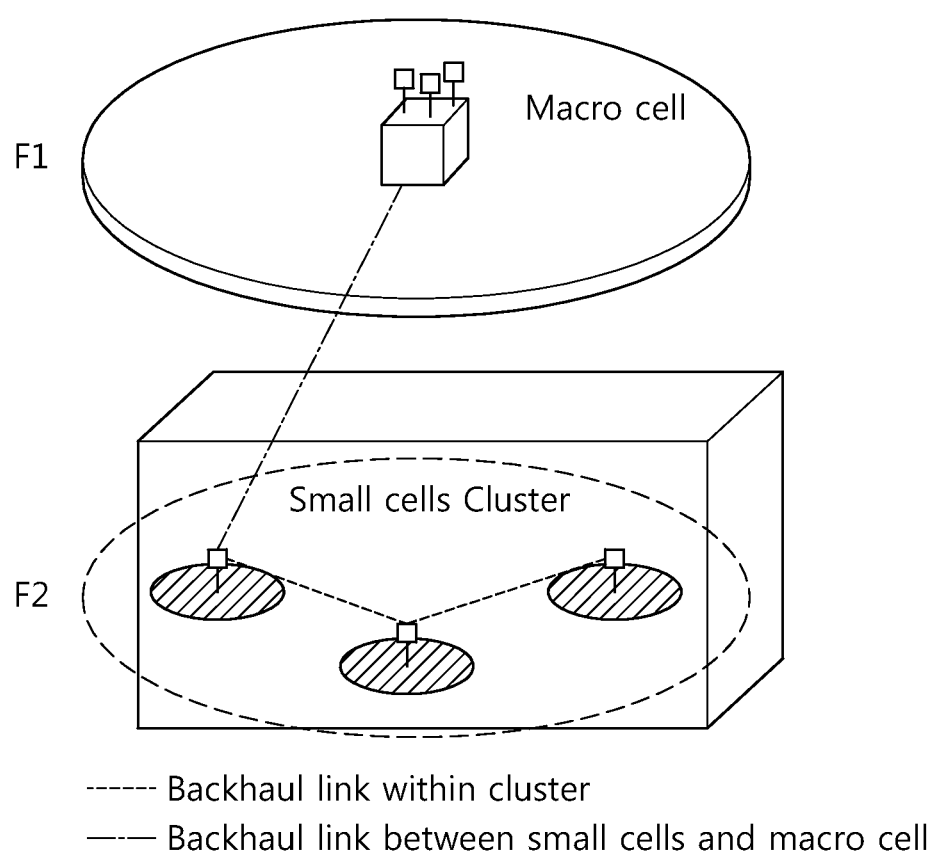
FIG. 9 shows another example of small cell deployment scenario.

FIG. 9 shows another example of small cell deployment scenario. Referring to FIG. 9, small cells are deployed in the presence of an overlaid macro network. The macro cell and the small cells are deployed using different frequencies. That is, the macro cell uses frequency F1, and the small cells use frequency F2. Further, the macro cell is deployed in outdoor, and the small cells are deployed in indoor. Users may be distributed both for outdoor and indoor. Further, a small cell cluster may be considered. The small cell cluster may be denser than scenarios considered for LTE rel-10 eICIC, 3GPP rel-11 feICIC/CoMP transmission/reception. Alternatively, a sparse scenario may be considered such as the indoor hotspot scenario evaluated for LTE rel-10 scenarios. Further, both ideal backhaul and non-ideal backhaul may be considered for an interface between the small cells within the same small cell cluster, or an interface between the small cell cluster and at least one macro eNB. Further, non-ideal backhaul may be assumed for all other interfaces.

Figure 10:
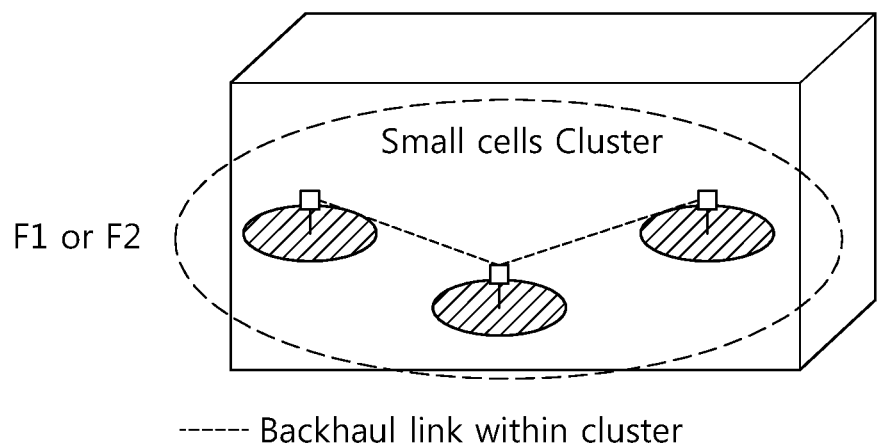
FIG. 10 shows another example of small cell deployment scenario.

FIG. 10 shows another example of small cell deployment scenario. Referring to FIG. 10, macro cell coverage is not present. Small cells are deployed using frequency F1 or F2. Further, the small cells are deployed in indoor. Users may be distributed both for outdoor and indoor. Further, a small cell cluster may be considered. The small cell cluster may be denser than scenarios considered for LTE rel-10 eICIC, 3GPP rel-11 feICIC/CoMP transmission/reception. Alternatively, a sparse scenario may be considered such as the indoor hotspot scenario evaluated for LTE rel-10 scenarios. Further, both ideal backhaul and non-ideal backhaul may be considered for an interface between the small cells within the same small cell cluster. Further, non-ideal backhaul may be assumed for all other interfaces.

For small cell enhancement, dual connectivity may be supported. By dual connectivity, a UE may be connected to both a master eNB (MeNB, or macro cell eNB) and secondary eNB (SeNB, or small cell eNB).

Figure 11:
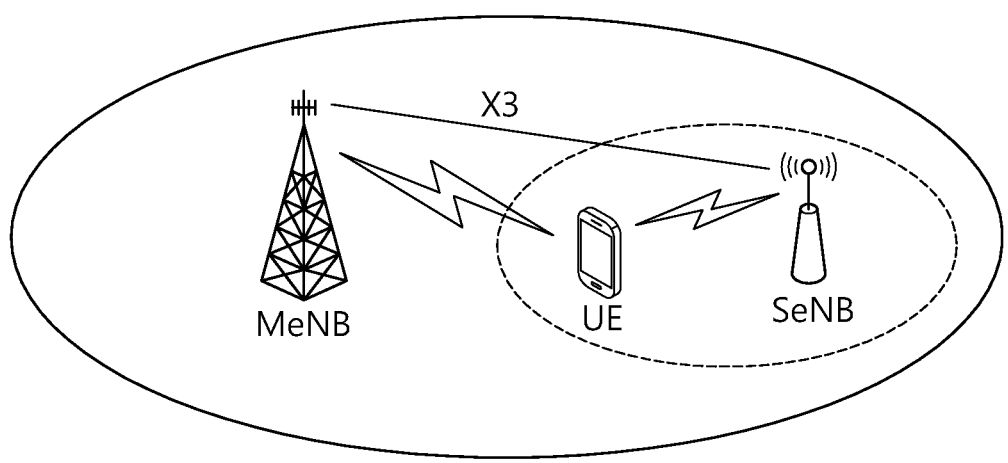
FIG. 11 shows an example of dual connectivity to MeNB and SeNB.

FIG. 11 shows an example of dual connectivity to MeNB and SeNB.

Referring to FIG. 11, the UE has dual connectivity to both the MeNB and SeNB. The MeNB is an eNB that is responsible for managing control plane specific operations, e.g., RRC connection control and mobility. The SeNB is an eNB that is responsible for managing user plane specific operations, e.g., transfer of data on DRBs. The MeNB and SeNB may be different nodes. The MeNB may serve a macro cell. The SeNB may serve a small cell or a group of small cells. Transfer of data on SRBs may be performed on the MeNB. Transfer of data on DRBs may be performed on either the MeNB or SeNB. Whether path of data on DRBs is on the MeNB or SeNB may be configured by the eNB, MME, or S-GW. There may be an X3 interface between the MeNB and the SeNB that is similar to the conventional X2 interface between eNBs. Because RRC connection reconfiguration is managed by the MeNB, the MeNB may transmit information about DRB configurations to the SeNB via X3 interface. Connectivity means the connection to eNB for data transfer. If the UE is served by one MeNB and one SeNB, it is considered that the UE has one connectivity for the MeNB and another connectivity for the SeNB. The UE may have multiple connectivity for SeNBs when the UE is served by small cells of the different SeNB.

In FIG. 11, it is assumed that dual connectivity is established for different eNBs in 3GPP LTE system, i.e., the MeNB and SeNB. However, dual connectivity may be established for different nodes in different systems. For example, dual connectivity may be established for an eNB in 3GPP LTE system and an access point (AP) in wireless local area network (WLAN) system. Or, dual connectivity may be established for an eNB in 3GPP LTE system and a NodeB (NB) in UMTS system. Or, dual connectivity may be established for an eNB in 3GPP LTE system and a new node in any system. However, at least one node constituting dual connectivity may always be an eNB.

For dual connectivity, if a UE establishes an RRC connection with a small cell, it is likely that the UE performs handover to a macro cell, immediately after connection establishment with the small cell. Since data transmission will be interrupted during handover, RRC connection establishment at the small cell will cause service interruption for dual connectivity.

Hereinafter, a method in which a UE establishes a connection according to an embodiment of the present invention is provided. According to the embodiment of the present invention, a UE in RRC_CONNECTED receives redirection information from a second cell and establishes a connection with a first cell based on the received redirection information.

Figure 12:
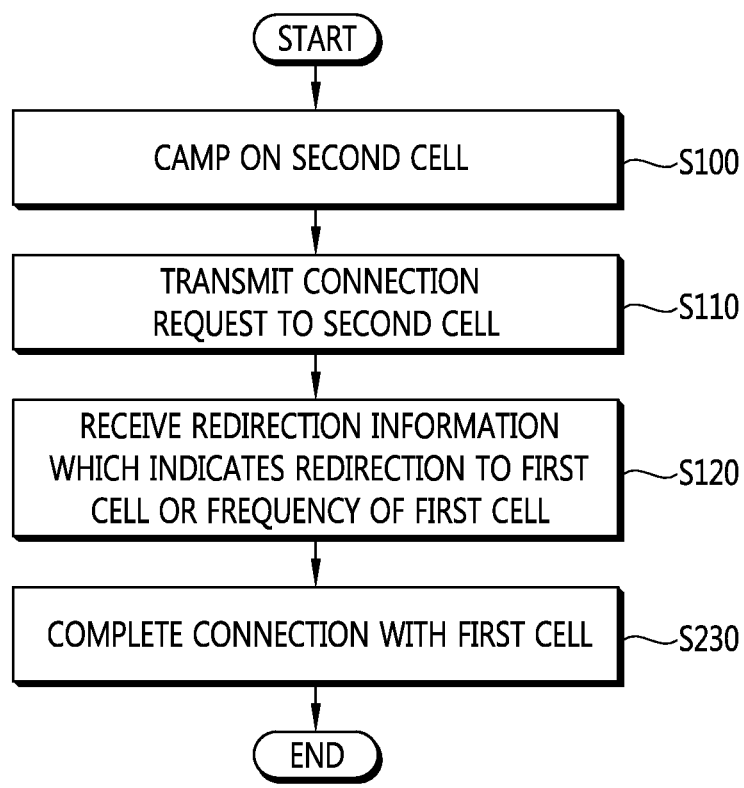
FIG. 12 shows an example of a method for establishing a connection according to an embodiment of the present invention.

FIG. 12 shows an example of a method for establishing a connection according to an embodiment of the present invention.

In step S100, the UE camps on a second cell. The UE may be in either RRC_IDLE or RRC_CONNECTED.

In step S110, the UE in RRC_CONNECTED transmits a connection request to the second cell. The connection request may be transmitted via an RRC connection request message.

In step S120, the UE receives redirection information, which indicates redirection to a first cell or a frequency of the first cell, from the second cell. The redirection information may be received via an RRC connection setup message after the UE transmits the RRC connection request message. The redirection information may be received via an RRC connection reject message after the UE transmits the RRC connection request message. The redirection information may be received via an RRC connection release message after successful RRC connection establishment. The redirection information may be received via an RRC message dedicated to the UE message after successful RRC connection establishment.

The redirection information may indicate a priority of a cell or a priority of a frequency. The redirection information may include at least one of followings:
the frequency of the first cell
a cell identity of the first cell;
a type of the second cell, e.g., one of a small cell, a pico cell, a femto cell, a closed subscriber group (CSG) cell and a hybrid cell
a type of the first cell, e.g., a macro cell In step S130, the UE completes connection with the first cell if connection establishment is required. Based on the received redirection information which indicates priority between the first/second cell and/or priority between the frequency of the first/second cell, the UE may establish a connection with the first cell. If the UE supports dual connectivity, the UE may perform a connection establishment with the first cell based on the received redirection information. If the UE cannot support dual connectivity, the UE may perform a connection establishment with the second cell by ignoring the received redirection information.

Alternatively, if the UE is not in high mobility, the UE may perform a connection establishment with the first cell. That is, if speed of the UE is lower than a certain threshold, the UE may perform a connection establishment with the first cell. Otherwise, the UE may perform a connection establishment with the second cell. The threshold may be signaled by the network such as the first cell or the second cell.

The UE may inform the network such as the first cell or the second cell whether or not the UE can support dual connectivity, either during RRC connection establishment, via RRC connection request or RRC connection setup complete, or after RRC connection establishment.

In the embodiment described in FIG. 12, the first/second cell may be defined in various ways. When the UE supports dual connectivity between eNBs in 3GPP LTE system, the first cell, e.g., macro cell, may be served by a master eNB (MeNB) in the 3GPP LTE system. Further, the second cell, e.g., small cell, pico cell, femto cell, CSG cell or hybrid cell, may be served by a secondary eNB (SeNB). When the UE supports dual connectivity between an eNB in 3GPP LTE system and an AP in WLAN system, the first cell may be served by the eNB, and the second may be served by the AP. When the UE supports dual connectivity between an eNB in 3GPP LTE system and a NB in UMTS system, the first cell may be served by the eNB, and the second may be served by the NB.

Alternatively, an embodiment of the present invention may be applied for carrier aggregation (CA) or LTE in unlicensed band (LTE-U) as well as dual connectivity as described above. For example, when an embodiment of the present invention is applied for the CA, the first/second cell may be cells configuring the CA. In this case, the first cell may be a primary cell (PCell), and the second cell may be a secondary cell (SCell). The first/second cells may be provided by one eNB. Alternatively, when an embodiment of the present invention is applied for the LTE-U, at least one of the first/second cells may be a cell provided at an unlicensed band in 3GPP LTE. The first/second cells may be provided by one eNB.

Figure 13:
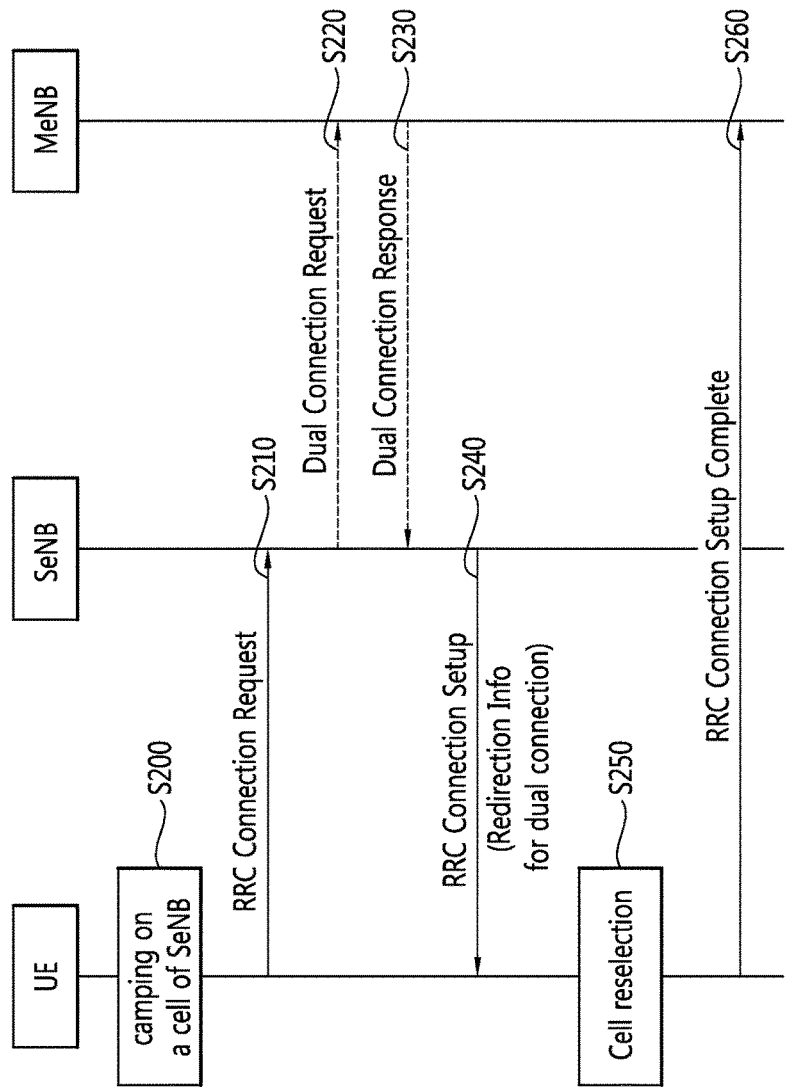
FIG. 13 shows an example of a method for performing cell reselection according to another embodiment of the present invention.

FIG. 13 shows an example of a method for performing cell reselection according to another embodiment of the present invention.

In step S200, the UE in RRC_IDLE camps on a cell of the SeNB. The UE may receive system information from the SeNB. The system information may inform the UE that the SeNB supports dual connectivity.

In step S210, the RRC layer of the UE transmits an RRC connection request message to the SeNB, if the RRC connection is requested by the higher layer of the UE, and if the UE supports dual connectivity.

In step S220, upon receiving the RRC connection request, the SeNB may transmit a dual connection request to the MeNB with an identity of the UE.

In step S230, the MeNB may transmit a dual connection response to the SeNB. The dual connection response may include acceptance of this connection and information related to this RRC connection establishment.

In step S240, if the MeNB accepts this connection, the SeNB transmits an RRC connection setup message to the UE. The RRC connection setup message may include redirection information for dual connectivity. The redirection information may include a frequency of a cell of the MeNB or a cell identity of the cell of the MeNB.

In step S250, the UE performs cell reselection to the cell of the MeNB. In the meantime, the UE may transmit an RRC connection setup complete message to the SeNB, and maintain the RRC connection with the SeNB.

In step S260, the RRC layer of the UE transmits an RRC connection setup complete message to the MeNB. The RRC connection setup complete message may include the UE identity.

Figure 14:
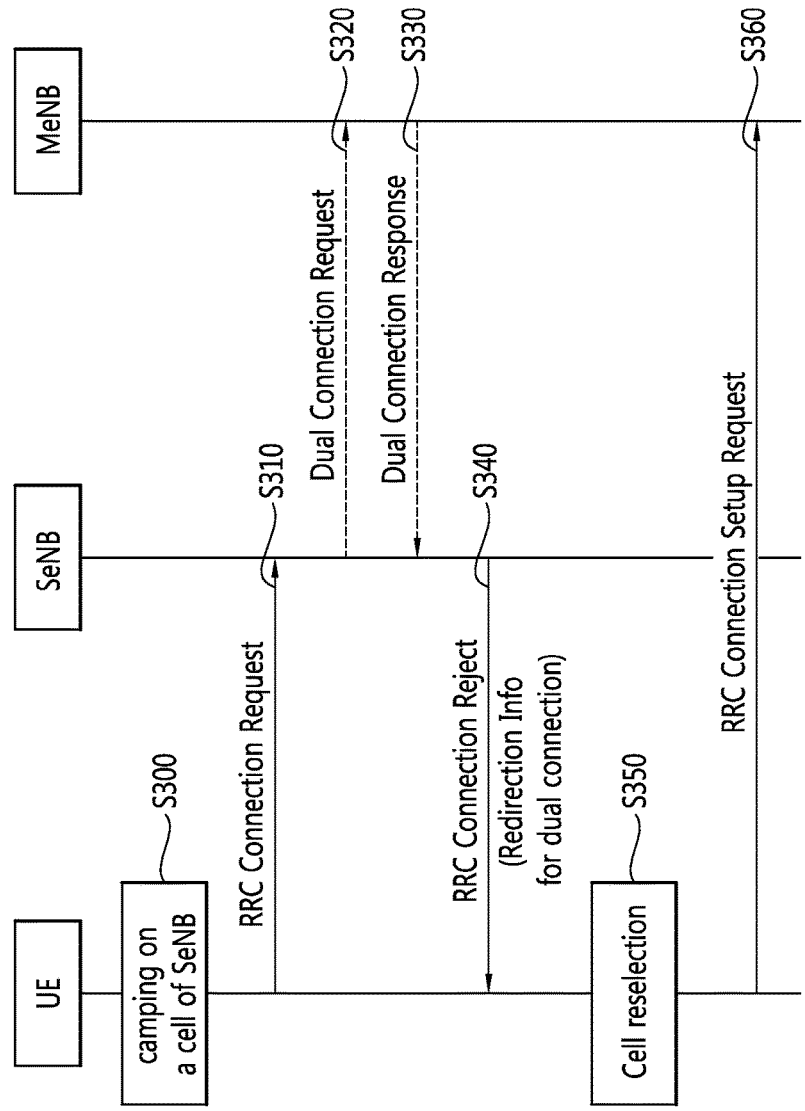
FIG. 14 shows an example of a method for performing cell reselection according to another embodiment of the present invention.

FIG. 14 shows an example of a method for performing cell reselection according to another embodiment of the present invention.

In step S300, the UE in RRC_IDLE camps on a cell of the SeNB. The UE may receive system information from the SeNB. The system information may inform the UE that the SeNB supports dual connectivity.

In step S310, the RRC layer of the UE transmits an RRC connection request message to the SeNB, if the RRC connection is requested by the higher layer of the UE, and if the UE supports dual connectivity.

In step S320, upon receiving the RRC connection request, the SeNB may transmit a dual connection request to the MeNB with an identity of the UE.

In step S330, the MeNB may transmit a dual connection response to the SeNB. The dual connection response may include acceptance of this connection and information related to this RRC connection establishment.

In step S340, if the MeNB accepts this connection, the SeNB transmits an RRC connection reject message to the UE. The RRC connection reject message may include redirection information for dual connectivity. The redirection information may include a frequency of a cell of the MeNB or a cell identity of the cell of the MeNB.

In step S350, the UE performs cell reselection to the cell of the MeNB.

In step S360, the RRC layer of the UE transmits an RRC connection setup complete message to the MeNB. The RRC connection setup complete message may include the UE identity.

Figure 15:
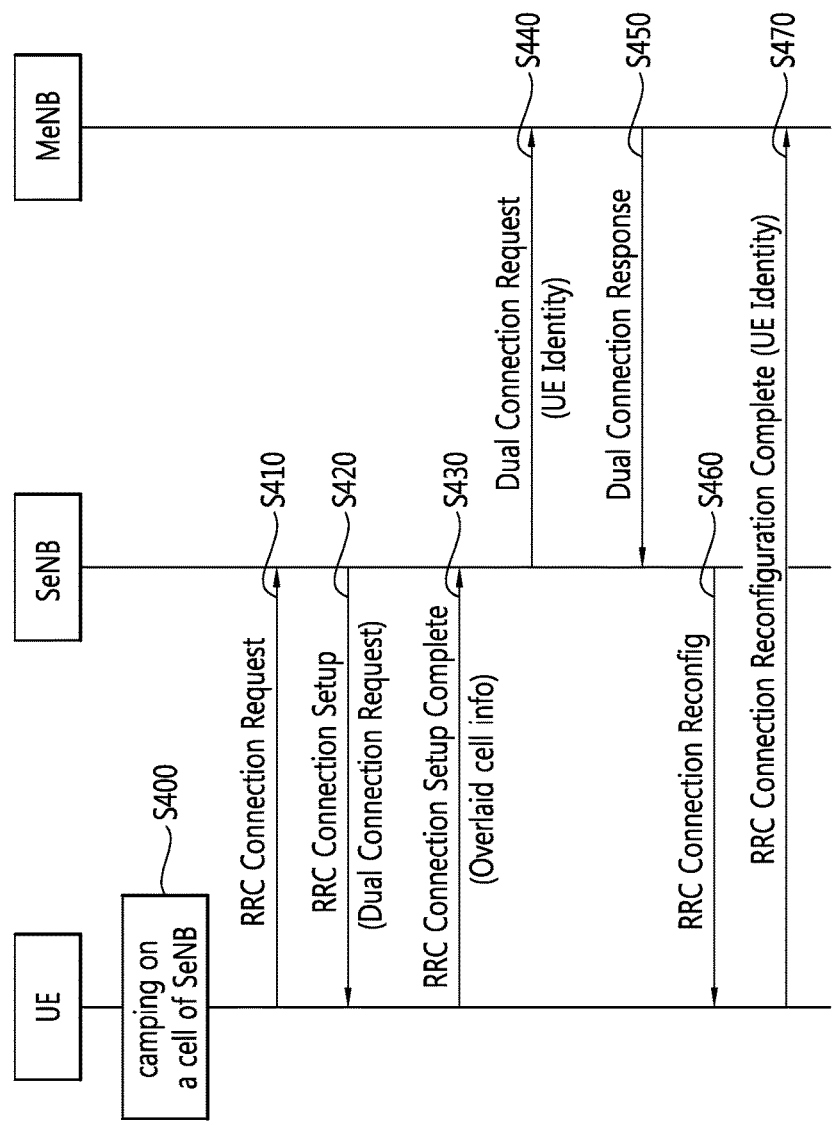
FIG. 15 shows an example of a method for performing cell reselection according to another embodiment of the present invention.

FIG. 15 shows an example of a method for performing cell reselection according to another embodiment of the present invention.

In step S400, the UE in RRC_IDLE camps on a cell of the SeNB. The UE may receive system information from the SeNB. The system information may inform the UE that the SeNB supports dual connectivity.

In step S410, the RRC layer of the UE transmits an RRC connection request message to the SeNB, if the RRC connection is requested by the higher layer of the UE, and if the UE supports dual connectivity.

In step S420, the UE receives an RRC connection setup message from the SeNB. The RRC connection setup message may include a dual connection request. Only if the UE supports dual connectivity, the UE may interpret the dual connection request in the RRC connection setup message.

In step S430, the UE transmits an RRC connection setup complete message to the SeNB. If the UE supports dual connectivity, and if the RRC connection setup message includes dual connection request, the UE may include overlaid cell information in the RRC connection setup complete message. The overlaid cell information may include information on one or more overlaid cells of which cell quality is higher than a certain threshold. Alternatively, if the UE receives the dual connection request, UE may report the overlaid cell information to the SeNB after RRC connection establishment.

In step S440, upon receiving the overlaid cell information, the SeNB may transmit a dual connection request to the MeNB with an identity of the UE.

In step S450, the MeNB may transmit a dual connection response to the SeNB. The dual connection response may include acceptance of this connection and information related to this RRC connection establishment.

In step S460, if the MeNB accepts this connection, the SeNB transmits an RRC connection reconfiguration message to the UE in order to cause the UE to make dual connection with the cell of the MeNB as well as the cell of the SeNB. The RRC connection reconfiguration message may include information on the cell of the MeNB.

In step S470, the UE transmits an RRC connection reconfiguration complete message to the MeNB for dual connectivity while the UE may maintain a connection with the cell of the SeNB. The RRC connection reconfiguration complete message may include the UE identity.

Figure 16:
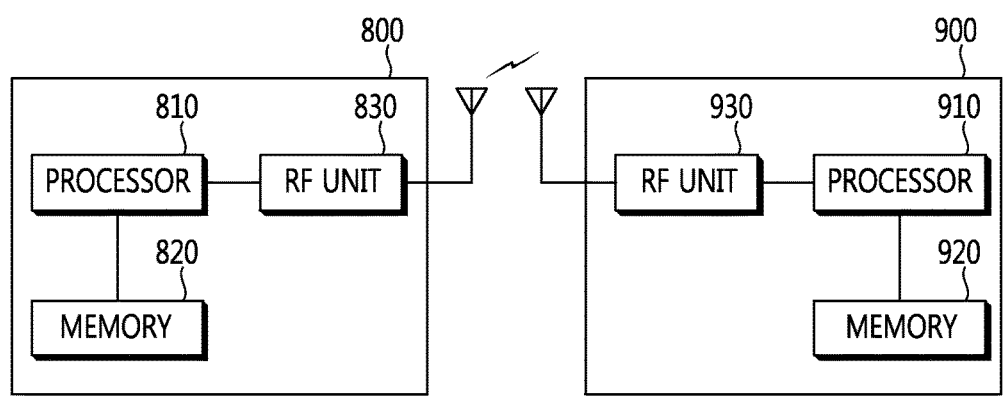
FIG. 16 shows a wireless communication system to implement an embodiment of the present invention.

FIG. 16 shows a wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for establishing, by a user equipment (UE), a connection in a wireless communication system, the method comprising:
   camping on a second cell;
   transmitting a connection request to the second cell;
   receiving redirection information, which indicates redirection to a first cell or a frequency of the first cell, from the second cell in response to the connection request; and
   completing connection with the first cell based on the received redirection information,
   wherein the first cell is a macro cell served by a master eNodeB (MeNB), and
   wherein the second cell is a small cell served by a secondary eNodeB (SeNB).

2. The method of claim 1, wherein the UE is in a connected mode.

3. The method of claim 1, wherein the connection request is transmitted via a radio resource control (RRC) connection request message.

4. The method of claim 1, wherein the redirection information includes at least one of a cell identity of the first cell, a type of the second cell, or a type of the first cell.

5. The method of claim 1, wherein the redirection information is received via one of an RRC connection setup message, an RRC connection reject message, an RRC connection release message, or an RRC message dedicated to the UE.

6. The method of claim 1, wherein the completing connection with the first cell comprises transmitting a message to the first cell.

7. The method of claim 6, wherein the message is one of an RRC connection setup complete message or an RRC connection reconfiguration complete message.

8. The method of claim 6, wherein the message includes an identity of the UE.

9. The method of claim 1, further comprising:
transmitting an RRC connection request message to the first cell.

10. The method of claim 1, further comprising:
transmitting an RRC connection setup complete message including information on overlaid cell to the second cell.

11. The method of claim 10, further comprising:
receiving an RRC connection reconfiguration message from the second cell.

12. The method of claim 1, wherein the UE supports dual connectivity.

13. The method of claim 1, wherein the UE is not in high mobility.

14. A user equipment (UE) in a wireless communication system, the UE comprising:
a radio frequency (RF) unit that transmits or receives a radio signal; and
a processor coupled to the RF unit, that:
camps on a second cell;
controls the RF unit to transmit a connection request to the second cell;
controls the RF unit to receive redirection information, which indicates redirection to a first cell or a frequency of the first cell, from the second cell in response to the connection request; and
complete connection with the first cell based on the received redirection information,
wherein the first cell is a macro cell served by a master eNodeB (MeNB), and
wherein the second cell is a small cell served by a secondary eNodeB (SeNB).

* * * * *